Sept. 28, 1943. G. T. BALFE 2,330,662
METHOD FOR MAKING WINDOW RUN
Filed July 31, 1940
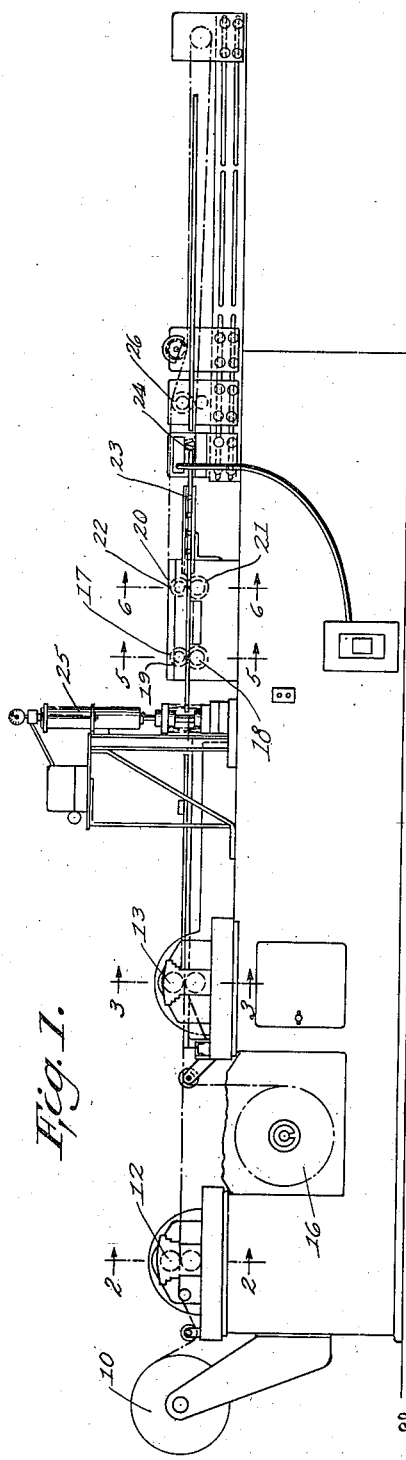
Inventor
George T. Balfe
By Cushman Darby Cushman
Attorneys Patented Sept. 28, 1943

2,330,662

UNITED STATES PATENT OFFICE 2,330,662

METHOD FOR MAKING WINDOW RUN

George T. Balfe, Detroit, Mich., assignor to Detroit Gasket & Mfg. Company, Detroit, Mich., a corporation of Michigan Application July 31, 1940, Serial No. 348,935

3 Claims. (Cl. 153—2)

This invention relates to an improved method for making window run material. The invention also embodies a new window run material which is highly advantageous for the windows of automobiles, trucks and other vehicles as well as for general use.

The primary object of the invention is to afford a continuous method for making the window run material. This method embodies the step of continuously forming a continuous strip of thin reinforcing metal such as steel with upstruck projections therein, feeding such continuous strip into centered relation upon and in combining relation with a continuously fed and wider continuous composite strip of bituminized relatively thick paper or thin board having a cloth layer adhered by the bituminized impregnant to one surface thereof, and then combining the layers in a manner to cause the composite paper-fabric layer to completely enclose the metal layer with the projections engaging into the paper layer, but not projecting into the cloth covering. The reinforced flat material is then formed to window channel shape and simultaneously with the forming is severed into predetermined lengths suitable for packaging or delivering to storage.

Another object of the invention is to provide a method as described in which all of the steps are automatically carried out without the necessity for any manual effort so that a uniform product is obtained and at a rate which is commercially satisfactory.

Equally important with the foregoing, it is an object of the invention to provide a method suitable for a machine for carrying out the steps automatically in sequence which is simple, easily controlled, and flexible so as to take care of channel run of different sizes, lengths and structure.

A further object of the invention is to provide a method suitable for a machine in which means are provided for automatically removing finished channel run in predetermined lengths at a speed sufficiently greater than the normal rate of travel of the succeeding strip so that there is no opportunity for clogging with resultant distortion of the formed and unformed material or necessity for stopping the machine and thereby producing delay and reduction of output.

Before describing in detail the present invention, it is to be understood that the invention is not limited in its application to the details of construction and arrangements of parts illustrated in the accompanying drawing, since the invention is capable of other embodiments and of being practiced or carried out in various ways. Also, it is to be understood that the phraseology or terminology employed herein is for the purpose of description and not of limitation.

In the drawing,

Figure 1 is a plan view of the apparatus for carrying out the continuous automatic operation of forming the window channel run of the present invention;

Figure 2 is a view in section of the metal reinforcing strip with projections struck up therefrom;

Figure 3 is a sectional view showing the metal reinforcement of Figure 2 enclosed in an envelope of bituminized paper which contacts with the metal layer and which is in turn covered by an adherent layer of fabric such as felt;

Figure 4 is a view of a modification similar to Figure 3 in which the fabric layer only partially covers the bituminized paper envelope;

Figure 5 is a sectional view of the window run material shown in Figure 3 at one stage of the shaping operation;

Figure 6 is a similar view at the final stage of the forming operation, and

Figure 7 is a plan view showing the combining apparatus employed in forming the construction of Figure 4 wherein the soft material strip and the covering material strip are separately or independently fed.

Referring to the drawing, I have shown at 10 a roll of thin strip steel which is formed with a multiplicity of upstanding projections 11 throughout one surface thereof as shown in Figure 2 substantially in accordance with the patent to Balfe, No. 1,927,450 by means of the apparatus 12 which is a sheet metal perforating machine similar to that set forth in Balfe Patents No. 1,843,438. The continuous band 10 is passed through the apparatus 12 continuously to a combining instrumentality 13.

At the same time, a layer of soft material in which the projections 11 may embed such as bitumized paper of the order of thin paper board 14, wider than the reinforcing strip 10 and having a coextensive covering of cloth, felt, or other fabric 15 adhered by the bitumen or other suitable adhesive on one surface thereof is fed from the roll 16 to the combining apparatus 13.

In the combining apparatus, the metal layer is centered longitudinally upon the paper-fabric layer and the extended portions of the latter are folded over the upper surface of the metal layer to completely enclose the same as shown in Figure 3 with the paper layer in contact with the metal layer. The reinforced and enveloped composite strip is then fed through suitable rolls in the combining machine which compress the layers of the strip together so that the meeting ends of the paper-fabric layer form a flush joint and the projections 11 are embedded in the adjacent surface of the board without protruding through the same into the fabric. It is to be understood, that the forming of the enveloped and reinforced strip shown in Figure 3 is produced continuously by combining the respective continuous layers 10 and 14—15 as described.

The continuous laminated strip shown in Figure 3 is continuously combined in as described and fed through and from the combining apparatus to a forming instrumentality 17. This forming means comprises a lower roll 18 and an upper roll 19 which engage the strip continuously passing therethrough to form i. e. bent and shaped the same to the contour shown in Figure 5. The strip so formed continuously passes to a second forming instrumentality 20 comprising a lower roll 21 and an upper roll 22 which so engage the strip having the contour shown in Figure 5 that it is formed i. e. bent and shaped into final channel shape as shown in Figure 6. It will be noted that the meeting edges or flush joint formed by the free edges of the paper-fabric layer are disposed within the bottom of the channel as shown in Figure 6.

The metal working rolls 12, the combining rolls 13 and the forming and shaping instrumentalities 17 and 18 are positively operated to draw the continuous strip continuously through the several instrumentalities, and from the forming instrumentality 20, the strip is continuously passed into contact with fixed guide members 23 which may be disposed within the channel or along the outer surfaces of the sides thereof, or both. This movement of the strip continues and the free edge thereof engages a trip member 24. As this member is tripped, it is pushed upward so as to allow the channel strip to clear and by such movement, an electrical circuit is established whereby the air-operated and reciprocating punch press 25 is caused to descend and sever a predetermined length of strip. It will be noted that this predetermined length of strip will include portions in continuous process of formation as shown in Figures 3 (flat) 5 (partially bent and shaped) and 6 (completely formed), and such length is drawn by the forming and shaping instrumentalities 17 and 20 through the same and shaped to final form. When the entire length of the predetermined strip has been given the final channel shape as shown in Figure 6, the advanced portion is brought into contact with the high speed rolls 26 which rotate at a speed greater than that of the rolls 12, 13, 17 and 20 and pass the finally formed channel run to a conveyor or box for shipment. When the remote end of the finally formed predetermined length of window run passes beyond the trip member 24, the latter descends to its former tripping position to be engaged by the free end of the succeeding continuous length of channel run for accomplishing the severing operation as just described. It is to be understood, that the unsevered following length of continuous strip continues to feed forward after the severing of a predetermined length, to be engaged by the forming and shaping instrumentalities 17 and 20, and that by reason of the more rapid removal of the severed predetermined finally formed channel run through the medium of the high-speed rolls 26, there is no opportunity for the continuous strip to engage the severed length which might result in distortion and clogging of the machine with consequent injury and delayed production.

By reason of the method and construction described, predetermined lengths of channel run of uniform construction are automatically and continuously produced in a commercially feasible manner.

Referring to Figure 4, the metal layer 10 is similar to that shown in Figure 2 and is enclosed in a layer of bituminized paper 14 as shown. The cloth covering layer 15, however, does not entirely enclose the construction, as is the case with the construction shown in Figure 3, but only one side, the ends and the marginal edge portions of the other side. It will be noted that the cloth covers the joint 27 between the ends of the asphalt paper.

In forming the window run material of Figure 4, only the paper or board is fed from the roll 16 and the metal and paper are combined in the instrumentality 13 in the manner previously described. The cloth is fed from a separate roll 28 into combining relation with the paper-enclosed metal strip and it is combined on the upper surface of the same by an instrumentality similar to the instrumentality 13 so as to produce the construction shown in Figure 4 with the joint 27 concealed by the cloth layer. Thereafter, the operation of the machine is the same as previously described.

All of the instrumentalities described are operated from a single prime mover such as an electric motor whereby the speed of the rolls 12, 13, 17 and 22 is controlled to give a uniform feed, the rolls 26 being given a higher speed through the medium of a suitable gear connection and the punch 25 being actuated in its reciprocating movement by a suitable clutch mechanism. It will be noted that a simple automatic machine is provided which is quite flexible, i. e., constructions both as shown in Figures 3 and 4 being readily formed by simply connecting up the roll 28 and another combining apparatus 13.

It will thus be seen I have developed a method and machine of making window run comprising continuously feeding a thin strip of metal 10 to a metal working instrumentality 12 and forming up-struck projections 11 from the upper side thereof, and continuously feeding a wider strip of non-metallic covering material 14—15 into combining relation with the metal strip. The metal strip is superposed upon the wider non-metallic strip in longitudinally centered relation thereto and the transversely extended portions of the non-metallic strip are folded so as to enclose the upper surface of the metallic strip from which the projections 11 extend. In the combining instrumentality the composite or laminated strip, i. e., the metal strip enclosed in the paper-fabric strip is compressed and the projections are caused to enter or engage the non-metallic material, namely, the paper, but do not extend into the fabric surface layer. The joint or meeting edges of the paper-fabric layer are on the upper surface of the metal strip and as the composite strip is formed to window run contour, this joint lies on the inside of the channel at the bottom thereof. The independent strip materials 12 and 14—15 are continuously fed at a constant speed respectively through the instrumentalities 12, 13, 17 and 20 while the punch 25 which is disposed between the combining means 13 and the first forming means 17 is intermittently actuated, without interrupting the continuous constant feeding movement of the independent and composite strips. As heretofore pointed out, when a predetermined length is severed, a part of it has been formed to final channel form as shown in Figure 6 while the remainder is undergoing formation in the instrumentalities 17 and 20. When one of these lengths has been completely formed, its advance end will have reached the high speed rolls 26 and at the same time, its remote end will have passed beyond the movable trip member 24 which returns from its moved position to be engaged by the constantly fed and formed advancing continuous channel strip, so that the repeated operation of severing the continuous channel strip into predetermined lengths is carried out. This intermittent automatic severing operation, as explained, does not result in any interruption of the constant feeding of the strip material either of the independent strips or the combined or composite strip or channel. These all move at a constant speed while the rolls 26 operate at a greater speed on the completed length of window run and thereby clear the machine of one predetermined length of material substantially simultaneously with the severing of the next consecutive predetermined length from the continuous strip. The provision of the trip member affords an intermittent and automatic means for actuating the punch and also assures that the constantly fed strip will be severed in uniform predetermined lengths.

In making the channel shown in Figure 4, the operation of the machine is the same, except as stated, the soft layer is independently fed and combined with the metal layer and the fabric layer is independently fed at the same constant speed of the other instrumentalities, but on the upper surface of the composite strip of metal enclosed in bituminized paper, as shown in Figure 7 where two similar combining apparatuses 13 are used. This fabric layer is of greater width than the composite strip and its transversely extended portions are folded about the same as shown in Figure 4 to cover one surface, the ends, and the marginal areas of the opposite surface and conceal the joint 27 between the meeting ends of the paper layer. In the channel formed from this material, the fabric layer lines the interior wall of the channel.

I have referred herein to paper which is relatively thick or of thin board-like character, and in calling for "paper" in the claims, I mean to include this type of material as well as equivalent paper-like products. Also, I have mentioned that the "paper" is bituminized, i. e., is impregnated or coated, or both, with a suitable bitumen such as asphalt. Such paper will have an adherent surface to which the cloth will permanently adhere, and also the bitumen will have an adherent function between the paper and the reinforcing metal layer. In this connection, a separate adhesive may be used to adhere the cloth to the paper in some cases. It is, however, preferred to use a bituminized paper or a paper which is weather and wear-resistant and not affected by water or moisture as well as extremes in temperature.

The method and apparatus herein described are useful also in forming window channel run in which the non-metallic covering layer comprises cork composition, i. e., comminuted cork united by a binder in lieu of the paper, adhesively united to a suitable textile or other fabric backing.

In some cases, and referring particularly to Figure 4, the covering layer 15 instead of being made of fabric, is made of thin sheet metal as, for example, steel band. Such a window run material can be readily produced by the aforesaid method and apparatus, the strip of metal being fed from the roll 28 and combined and formed in the manner described.

I claim:

1. Method of making window run comprising continuously feeding a strip of substantially flat thin sheet metal to a metal working instrumentality and forming up-struck projections providing perforations, continuously feeding a wider strip of substantially flat fabricated covering material and soft material into which said projections may embed themselves into combining face to face relation with the perforated metal strip by bringing the soft material and metal into surface contact, centering the metal strip longitudinally upon the said soft material and the covering strip and folding over the flat portions of the same extending transversely beyond the edges of the metal strip to enclose the metal strip, compressing the layers of the composite strip and causing the projections to enter and be embedded in the said soft material, bending the composite strip along longitudinal lines and shaping the composite strip to window run contour at one end, the independent strip material and the composite strip being continuously fed at uniform speed, severing predetermined lengths from said composite strip at a flat portion thereof while continuously feeding, combining, bending and shaping other portions of the same strip, and thereafter completely forming the remainder of the severed portion of the strip to the same contour.

2. The method in accordance with claim 1 in which the covering strip and soft material are fed as a combined unitary strip.

3. The method in accordance with claim 1 in which the covering strip and the soft material are separately fed and combined.

GEORGE T. BALFE.